June 2, 1925.  1,539,995
E. DICKMAN
FOLDING TOP FOR MOTOR VEHICLES
Filed May 10, 1923   3 Sheets-Sheet 1
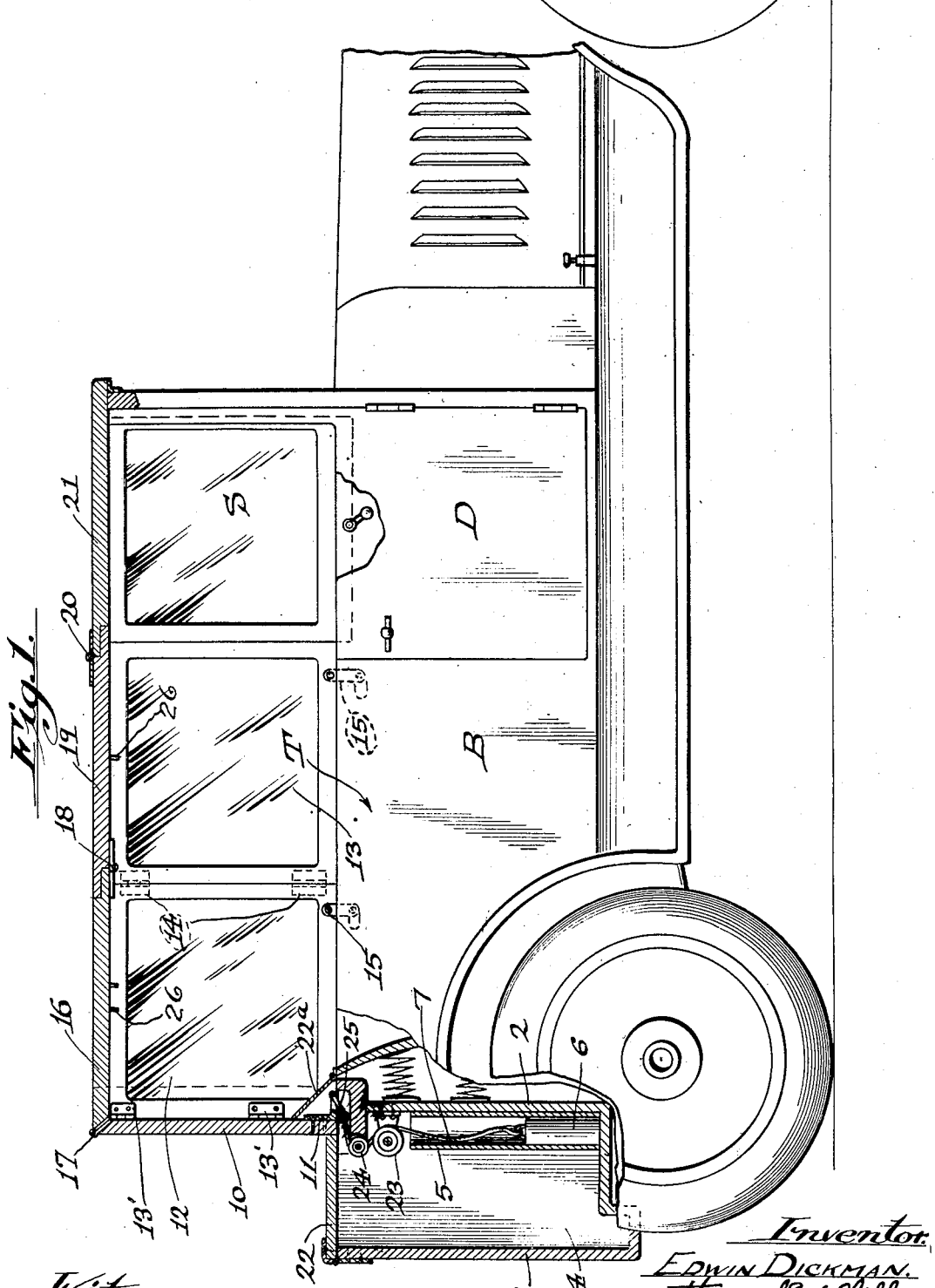

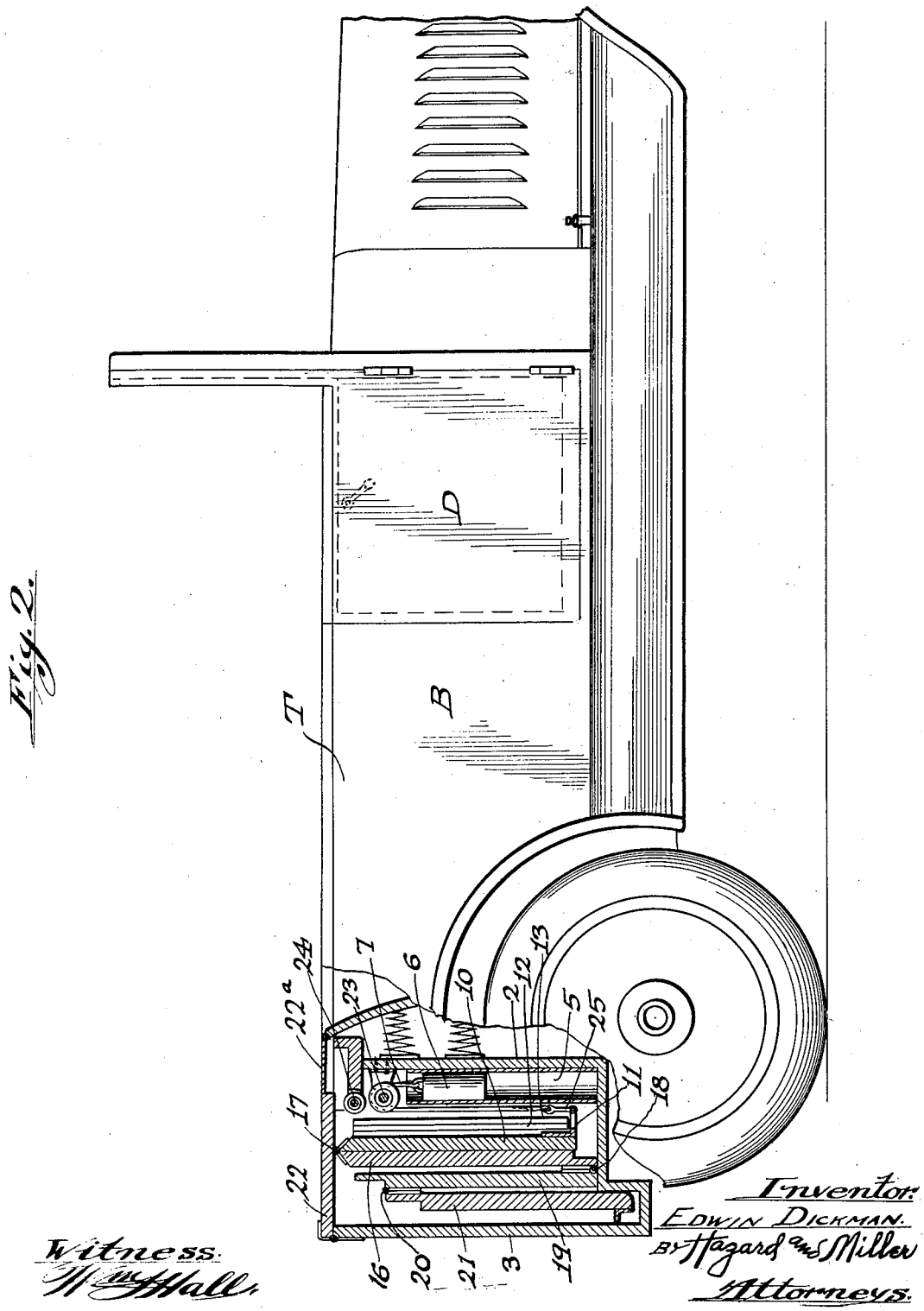

June 2, 1925.  
E. DICKMAN  
FOLDING TOP FOR MOTOR VEHICLES  
Filed May 10, 1923  
1,539,995  
3 Sheets-Sheet 3
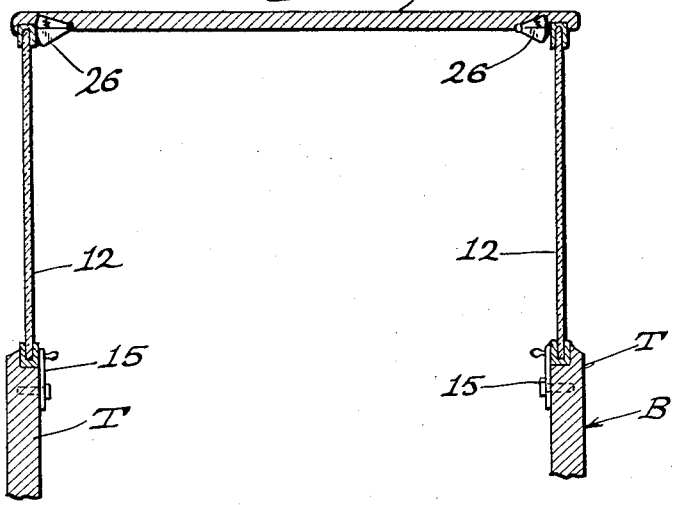
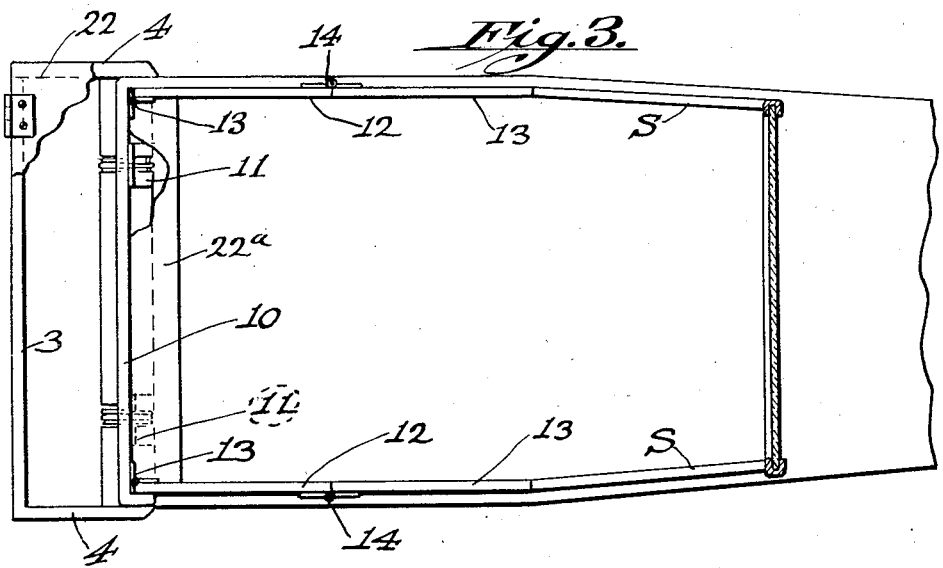
Inventor:
EDWIN DICKMAN.
By Hazard and Miller
Attorneys.
Witness.

Patented June 2, 1925.

1,539,995

UNITED STATES PATENT OFFICE.

EDWIN DICKMAN, OF RIVERSIDE, CALIFORNIA.

FOLDING TOP FOR MOTOR VEHICLES.

Application filed May 10, 1923. Serial No. 637,969.

*To all whom it may concern:*

Be it known that I, EDWIN DICKMAN, a citizen of the United States, residing at Riverside, in the county of Riverside and State of California, have invented new and useful Improvements in Folding Tops for Motor Vehicles, of which the following is a specification.

This invention relates to vehicle tops and has for an object to provide a collapsible, disappearing vehicle top which, when erected, is adapted to convert an open or touring type of vehicle into a closed or limousine type.

Another object is to provide a vehicle structure including a box or receptacle forming a part of the body and provided with a counterbalance means to facilitate raising and lowering of the collapsed elements forming the vehicle top and sides of the top. Another object is to provide a top including side-forming windows and panels, and a back-forming wall and a ceiling portion, all connected so as to be folded into a compact, bodily movable, nested relation, and compactly arranged in the receiver or box provided by and in the vehicle body.

Other objects and advantages will be made manifest in the following specification of an embodiment of the invention illustrated in the accompanying drawings, wherein—

Figure 1 is a side elevation of a conventional form of vehicle body showing the improved top set up in enclosing position, and in vertical section.

Fig. 2 is a side view of the vehicle showing the top closure forming elements collapsed or nested and concealed in the receptacle provided by the vehicle body.

Fig. 3 is a plan and horizontal section showing the parts as erected.

Fig. 4 is a vertical section showing in detail set up elements in the latched position.

The invention is shown as combined with a conventional form of vehicle body B, at the rear end of which is provided a receptacle including a front wall 2 and a rear wall 3, with suitable end walls 4. In this receptacle is arranged a guide or guides 5 to receive a counterweight or counterweights 6, which have flexible connections, as cables or pieces of chain 7, which are attached to one of the top or closure forming elements.

The enclosure structure consists of a back wall element 10, to the lower end of which is attached, by suitable means as angle brackets 11, the pieces of cable 7. The back element 10 has at each end an inwardly and outwardly folding window frame 12, which may be attached to the back as by hinges 13. The end and rear windows 12 are adapted to be folded in flat against the back 10 toward each other and to be folded outwardly to align vertically above the side walls of the body B, as clearly shown in Figure 3.

To the swinging ends of the rear windows 12 are intermediate windows 13, these being hinged at 14 to the windows 12, and these windows are shown as of substantially the same height, so that the right hand pairs of windows 12—13 and the left hand windows 12—13 can be opened into alignment and supported along the sides of the tonneau of the body.

When the side windows have been thus unfolded, they may be latched or temporarily fastened in side wall forming position, as by latch members 15 provided on the side walls of the tonneau T.

For forming the top or ceiling of the enclosure, there is attached to the upper, horizontal edge of the back element 10 a top section 16, shown as connected to the back by hinges 17. To the front edge of the top section 16 there is hinged at 18 an intermediate top section 19, and at the front edge of this there is provided hinges 20, to which are connected the front, top section 21, these sections being so hinged one to the other that they may be folded flatwise into a very compactly nested relation, as is clearly shown in Figure 2, where the collapsed top and side windows and back wall are shown as concealed in the receptacle at the rear end of the body.

The meeting edges of the top forming sections 16, 19 and 21, may each be recessed transversely so that the recessed edges may be moved into snug, overlapping position, as seen in Figure 1, when the top sections are extended to form the top or ceiling of the body. This not only provides for a firm form of joint between the edges, but also increases the effectiveness of the joint against water.

In dismantling or collapsing the closure, the top section 21 is folded over the top of the section 19, and then the section 16 is folded upwardly and rearwardly, and then the section 19 is folded down on the inner face of the section 16, and all of the sections are then swung down behind the back wall or element 10. The receptacle provided between the walls 2 and 3 is provided with a cover 22, which, when closed, serves to form a retaining means for the back wall 10, and when opened permits the collapsed top and back wall elements to be shifted rearwardly and then lowered down into the receptacle, the raising and lowering being facilitated by the counterbalance 6.

The flexible connection or connections 7 are designed to be guided around and over guide pulleys 23 and 24, provided in the receptable, and a link 25 connects the ends of the cable or cables 7 to the brackets 11.

To form the complete closure of the sides of the car and yet to provide for desired ventilation and signal and observation purposes, the front doors D of the vehicle may be of standard, well known or suitable form having a vertically movable sash frame or window structure S, so that the front windows can be raised or lowered at will, while the remaining portion of the closure is in set up position.

In Figure 14 is shown a form of means for latching the side windows in erected position, and such means are illustrated as including suitable gravity or spring actuated latches 26, which may be pressed to a releasing position into the respective top member as 16, when the respective windows are thrust outwardly toward the sides of the tonneau. After the windows have been properly set, the latches 26 will drop or spring back into effective latching position, and thus hold the windows snugly in place at their upper edges and prevent rattling.

When the enclosure parts are set up, as shown in Figure 1, the top or cover 22 of the receptacle swings down behind the back wall 10 to finish the closure. When the collapsed parts of the closure are concealed in the receptacle, the cover 22 is closed down and a supplemental cover member 22ª is also lowered to complete the covering of the top of the receptacle, as shown in Figure 2.

Further embodiments, modifications and variations may be resorted to within the principle of the invention.

What is claimed is:

1. The combination with a vehicle body, of a receptacle including a front wall, a rear wall, and walls connecting the front and rear walls, a counter-weight guide inside of the front wall, a counter-weight in the guide, a counter-weight pulley extending backwardly from the front wall above the guide, a flexible connection attached to the counter-weight and extending over the pulley, a second pulley above the first pulley and over which the flexible connection extends, a cover hinged to the back wall to swing forwardly and rest upon the end walls, a back wall element to which the upper end of the flexible connection is attached, the lower end of the back wall element fitting against the forward edge of the cover, a top section hinged to the upper edge of the back wall element and adapted to swing from a horizontal position upwardly and backwardly and downwardly against the back wall element, an intermediate top section hinged to the front edge of the first top section and adapted to swing downwardly against the inner face of the first top section, a front top section hinged to the front of the intermediate top section and adapted to swing upwardly and backwardly against the upper face of the intermediate top section, rear window frames hinged to the back wall element and intermediate window frames hinged to the forward edges of the rear window frames, the window frames being adapted to fold against each other and against the front face of the back wall element, and the back wall element and three top sections and window frames adapted to be folded and inserted into the receptacle when the cover is open and so that the cover may be closed after the insertion.

2. The combination with a vehicle body, of a receptacle including a front wall, a rear wall, end walls connecting the front and rear walls, a counter-weight guide inside of the front wall, a counter-weight in the guide, a counter-weight pulley extending backwardly from the front wall above the guide, a flexible connection attached to the counter-weight and extending over the pulley, a second pulley above the first pulley and over which the flexible connection extends, a cover hinged to the back wall to swing forwardly and rest upon the end walls, and a sectional folding top having one element attached to the flexible connection and adapted to fold and be placed in the receptacle.

3. The combination with a vehicle body, of a receptacle including a front wall, a rear wall, end walls connecting the front and rear walls, a counter-weight guide inside of the front wall, a counter-weight in the guide, a counter-weight pulley extending backwardly from the front wall above the guide, a flexible connection attached to the counter-weight and extending over the pulley, a second pulley above the first pulley and over which the flexible connection extends, a cover hinged to the back wall to swing forwardly and rest upon the end walls, a back wall element to which the upper end of the flexible connection is attached, the lower end of the back wall element fitting against the forward edge of the cover, a top section hinged to the upper edge of the back wall element and adapted to swing from a horizontal position upwardly and backwardly and downwardly against the back wall element, an intermediate top section hinged to the front edge of the first top section and adapted to swing downwardly against the inner face of the first top section, a front top section hinged to the front of the intermediate top section and adapted to swing upwardly and backwardly against the upper face of the intermediate top section, rear window frames hinged to the back wall element and intermediate window frames hinged to the forward edges of the rear window frames, the window frames being adapted to fold against each other and against the front face of the back wall element, there being stop shoulders and spring catches upon the rear and intermediate top sections to hold the upper edges of the unfolded windows and there being hand latches and stops for holding the lower edges of the unfolded windows, and the back wall element and three top sections and window frames adapted to be folded and inserted into the receptacle when the cover is open and so that the cover may be closed after the insertion.

In testimony whereof I have signed my name to this specification.

EDWIN DICKMAN.